(12) United States Patent
Kita et al.

(10) Patent No.: US 6,304,410 B1
(45) Date of Patent: Oct. 16, 2001

(54) HELICAL SCANNING MAGNETIC RECORDING/PLAYBACK DEVICE HAVING MULTIPLE PAIRS OF PLAYBACK HEADS AND RECORDING HEADS

(75) Inventors: Mikio Kita; Kaoru Urata, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 644 days.

(21) Appl. No.: 08/636,304

(22) Filed: Apr. 23, 1996

(30) Foreign Application Priority Data

Apr. 25, 1995 (JP) .................................................. 7-123011

(51) Int. Cl.[7] ...................................................... G11B 5/027

(52) U.S. Cl. ............................................................... 360/84

(58) Field of Search .............................. 360/84, 85, 119, 360/121, 130.24, 77.15

(56) References Cited

U.S. PATENT DOCUMENTS

| | | | |
|---|---|---|---|
| 5,012,355 | * 4/1991 | Taga et al. | 360/84 |
| 5,047,872 | * 9/1991 | Heitmann | 360/77.16 |
| 5,063,466 | * 11/1991 | Tamashita | 360/84 |
| 5,296,976 | * 3/1994 | Takayama et al. | 360/77.15 |
| 5,576,907 | * 11/1996 | Hasegawa | 360/107 |

* cited by examiner

*Primary Examiner*—George J. Letscher
(74) *Attorney, Agent, or Firm*—Ronald P. Kananen; Rader, Fishman & Grauer

(57) ABSTRACT

Two playback heads A1 and A2 having the same azimuth θ and having a track width $W_{11}$ equivalent to about 1.5 times the track width $W_2$ of the recording head are paired to form a pair of heads. These playback heads A1 and A2 paired to form a pair of heads are arranged so as to read one recording track T1 simultaneously in the condition with a gap of about one track pitch $T_P$ in the track width direction. Data of all recording tracks are thus read correctly without tracking during playback.

21 Claims, 13 Drawing Sheets

F I G. 12
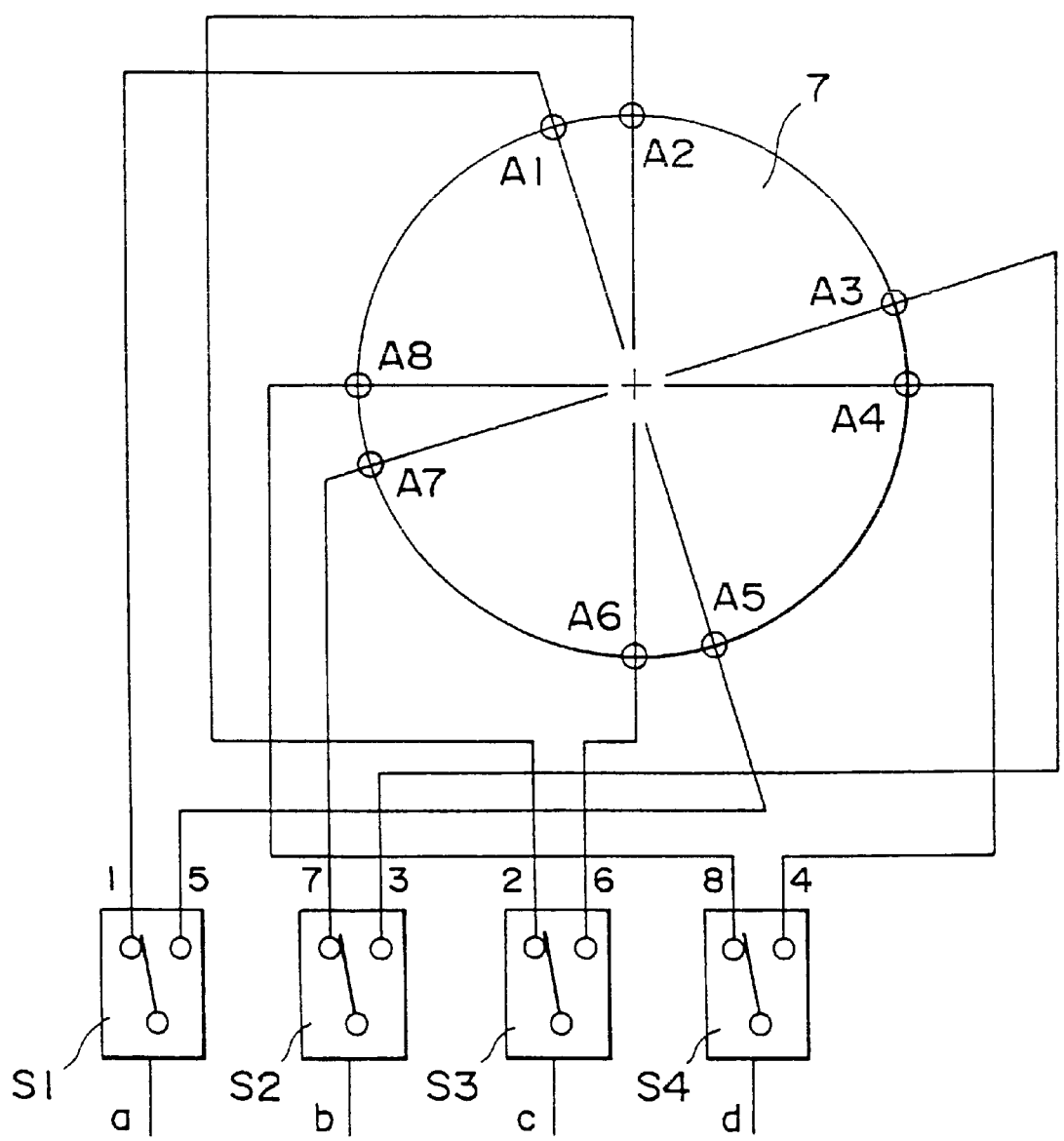

HELICAL SCANNING MAGNETIC RECORDING/PLAYBACK DEVICE HAVING MULTIPLE PAIRS OF PLAYBACK HEADS AND RECORDING HEADS

BACKGROUND OF THE INVENTION

This invention relates to a helical scanning magnetic recording/playback device suitable for digital magnetic recording/playback data on a magnetic tape by helical scanning using a recording head and playback head provided on the periphery of a rotary head drum.

Conventionally, for example, a U-tape loading mechanism of helical scanning digital magnetic recording/playback devices has been structured as shown in FIG. 13.

In detail, a magnetic tape 4 wound on a supply reel 2 and a take-up reel 3 in a tape cassette 1 attached at the place is drawn out from the tape cassette by a tape loading mechanism 6 having a loading ring 5, and is loaded on the peripheral surface of a rotary head drum 7 in a U-like shape helically.

At this time, the tape loading mechanism 6 rotates the loading ring 5 in the arrow direction a, thereby, magnetic tape 4 is wound on the periphery of the rotary head drum 7 by a plurality of rotatable guides 8 fixed on the loading ring 5. Simultaneously, draw guides 9 and 10 on both sides move to the arrow directions b and c respectively to draw the magnetic tape 4, whereby the magnetic tape is loaded.

Through the tape loading, the magnetic tape 4 is passed on a capstan 11, full width erasing head 12, audio recording/playback head 13, channel erasing head 14, and a plurality of fixed guides 15. The loading mechanism is structured so that the magnetic tape 4 is moved helically around the periphery of the rotary head drum 7 by the aid of a pair of fixed guides 15 provided at the tape inlet 16 and tape outlet 17 those are the entrance to and exit from the rotary head drum 7 for the magnetic tape.

After completion of the tape loading operation, a pinch roller 18 mounted on the loading ring 5 presses the magnetic tape 4 against the capstan 11 in the arrow direction d, and the magnetic tape 4 is moved at a constant speed in the arrow direction e along the running route while the magnetic tape is taken up from the supply reel to the take-up reel. While running of the magnetic tape 4, data on the magnetic tape is recorded/played back in digital magnetic helical scanning record/playback method by the rotary head drum 7 which is rotated at a high speed in the arrow direction f.

A conventional rotary head drum 7 of helical scanning digital magnetic recording/playback devices of this type is typically structured as shown in FIG. 14.

In detail, a set of components comprising an erasing head ER (A/B) and recording heads REC (A) and (B), and the other set of components comprising an erasing head ER (C/D) and recording heads REC (C) and (D) are provided differently in azimuth and central-symmetrically facing each other. Similarly, a set of playback heads PB (A) and (B) and the other set of playback heads PB (C) and (D) are provided differently in azimuth and central-symmetrically facing each other. The playback heads PB(A), PB(B), PB(C), and PB(D) correspond to the recording heads REC(A), REC(B), REC(C), and REC(D) respectively. Each playback head PB is positioned apart angularly from the corresponding recording head REC with a certain angle.

As shown in FIG. 15, the track width W1 of the playback heads PB(A), PB(B), PB(C), and PB(D) is the same as the track width W2 of the recording heads REC(A), REC(B), REC(C), and REC(D).

A shown in FIG. 15, the magnetic tape 4 is moved at a constant speed in the arrow direction e while the rotation drum 7 is rotated at a high speed in the arrow direction f, and data are written on recording tracks T1, T2, T3, and T4 of the magnetic tape 4 in helical scanning style by recording heads REC(A), REC(B), REC(C), and REC(D).

For playback, data on the recording tracks T1, T2, T3, and T4 are read by the corresponding playback heads PB(A), PB(B), PB(C), and PB(D) in the relation of one-to-one correspondence.

However, recently the narrow track has been popularized in the field of the helical scanning magnetic recording/playback device. The improvement in machine accuracy of a travel motion system such as rotary head drum 7 and magnetic tape 4 and the improvement in performance of a servo system are required for accurate tracking during playback, but enormous expenses are necessary for such improvement.

In some helical scanning magnetic recording/playback devices, signal areas exclusive for tracking are provided on the recording tracks T1, T2, T3, and T4 on the tape format, but such method is involved in a problem that the recording wave length is lost due to increased data rate.

Otherwise, in some conventional helical scanning magnetic recording/playback devices, when the traveling speed of a magnetic tape 4 is changed for variable speed playback, the rotation speed of the rotary head drum 7 is changed corresponding to the traveling speed of the magnetic tape 4. As a result, data on all recording tracks T1, T2, T3, and T4 of the magnetic tape 4 is read by the playback heads PB(A), PB(B), PB(C), and PB(D).

However, this method is involved in a problem of the response capability of the servo system for the rotary head drum 7 when the speed is changed. In addition, this method is involved another problem that the variation of the rotation speed of the rotary head drum 7 causes the change in air film thickness formed between the peripheral surface of the rotary head drum 7 and the magnetic tape 4 to result in insufficient contact of the magnetic tape 4 to the playback heads PB(A), PB(B), PB(C), and PB(D).

Otherwise for variable speed playback, in some conventional helical scanning magnetic recording/playback devices, dynamic tracking heads which are vibrated vertically at high frequency are used as the playback heads PB(A), PB(B), PB(C), and PB(D) so that not all data on recording tracks T1, T2, T3, and T4 but partial data of the magnetic tape 4 is read without varying the rotation speed of the rotary head drum 7 when the traveling speed of the magnetic tape 4 is changed. However, the dynamic tracking head is expensive and the servo circuit is complex, therefore, this method is involved in a problem of high cost.

OBJECTS AND SUMMARY OF THE INVENTION

The present invention has been accomplished to solve the above-mentioned problems, it is the object of the present invention to provide a helical scanning magnetic recording/playback device which can read correctly data of all recording tracks-without tracking for playback and read correctly data of all recording tracks without changing rotation speed of the rotary head drum for variable speed playback.

To achieve the above-mentioned object of the present invention, a helical scanning magnetic recording/playback device of the present invention is provided with a plurality of playback head pairs, each playback head pair comprises two playback heads in the same azimuth. The playback head has a track width wider than the track width of the corresponding recording head to have partially overlapped track widths so as to read single recording track simultaneously in a condition with a gap of partially overlapped area in the track width direction. A plurality of recording heads for writing recording tracks on a magnetic tape in helical scanning method and a plurality of playback heads for reading a plurality of recording tracks are mounted.

A helical scanning magnetic recording/playback device of the present invention is provided with a plurality of playback head pairs, each playback head pair comprises two playback heads in the same azimuth. The playback head has a track width wider than the track width of the corresponding recording head to have partially overlapped track widths so as to read single recording track simultaneously. The plurality of playback head pairs are positioned on the periphery of the rotary head drum with the same angular interval. A plurality of recording heads for writing recording tracks on a magnetic tape in helical scanning method and a plurality of playback heads for reading a plurality of recording tracks are mounted.

BRIEF DESCRIPTION OF THE DRAWINGS

FIG. 12 is a diagram for illustrating a switching circuit for selecting the combination of a pair of heads.

DESCRIPTION OF THE PREFERRED EMBODIMENTS

Figure 13:
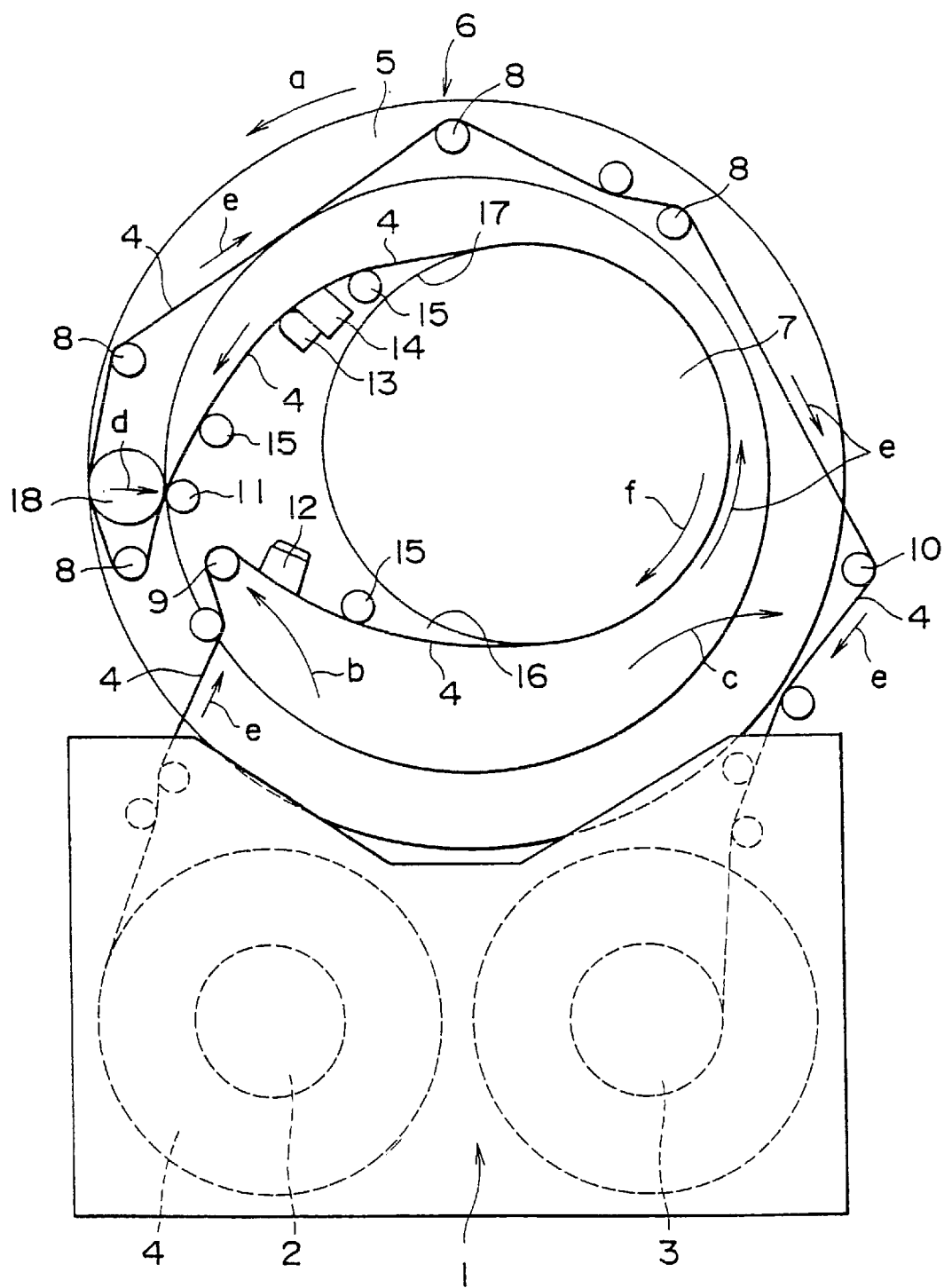
FIG. 13 is a diagram for illustrating a tape loading mechanism for U-shape loading of a helical scanning digital magnetic recording/playback device.
Figure 14:
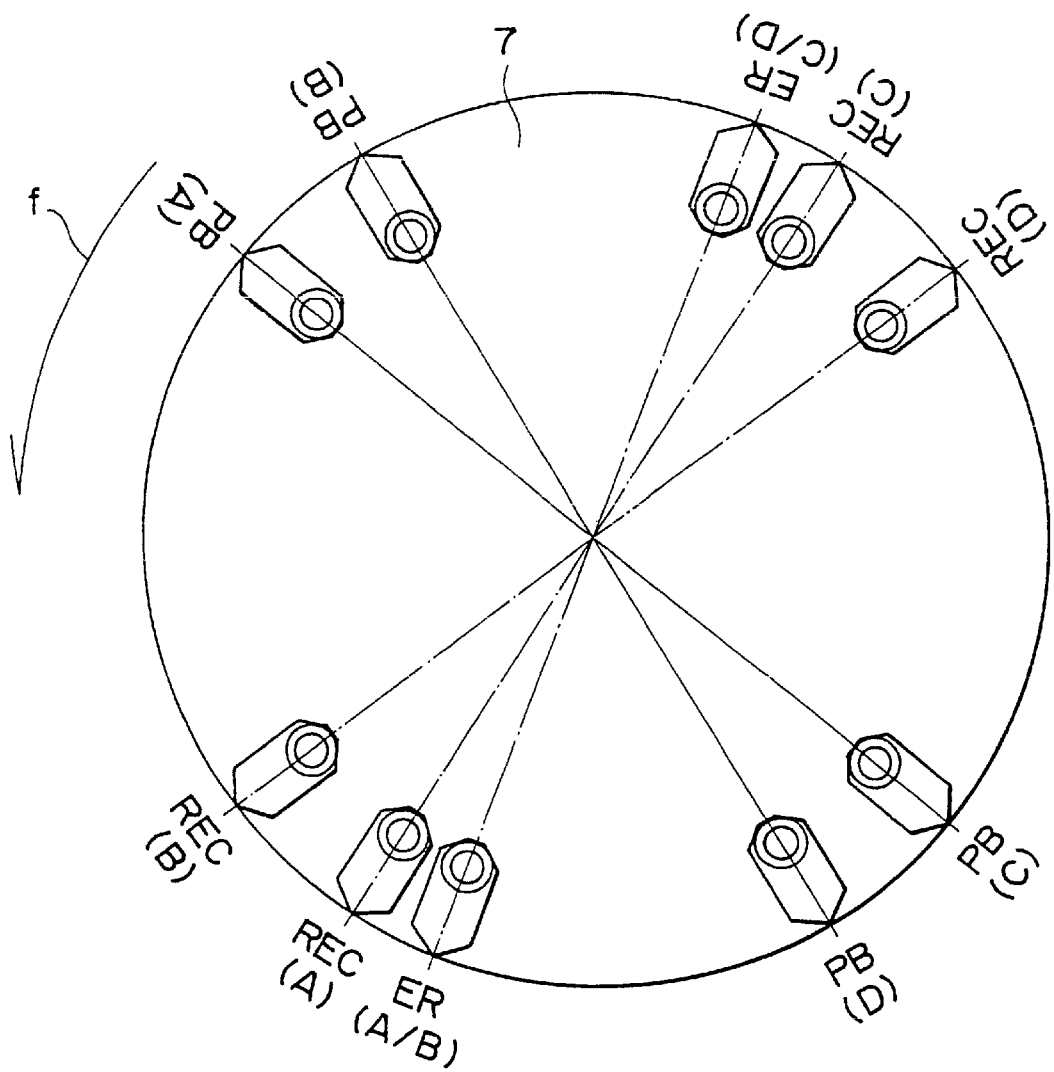
FIG. 14 is a bottom view of mounted heads for illustrating the head arrangement of a conventional rotary head drum.
Figure 15:
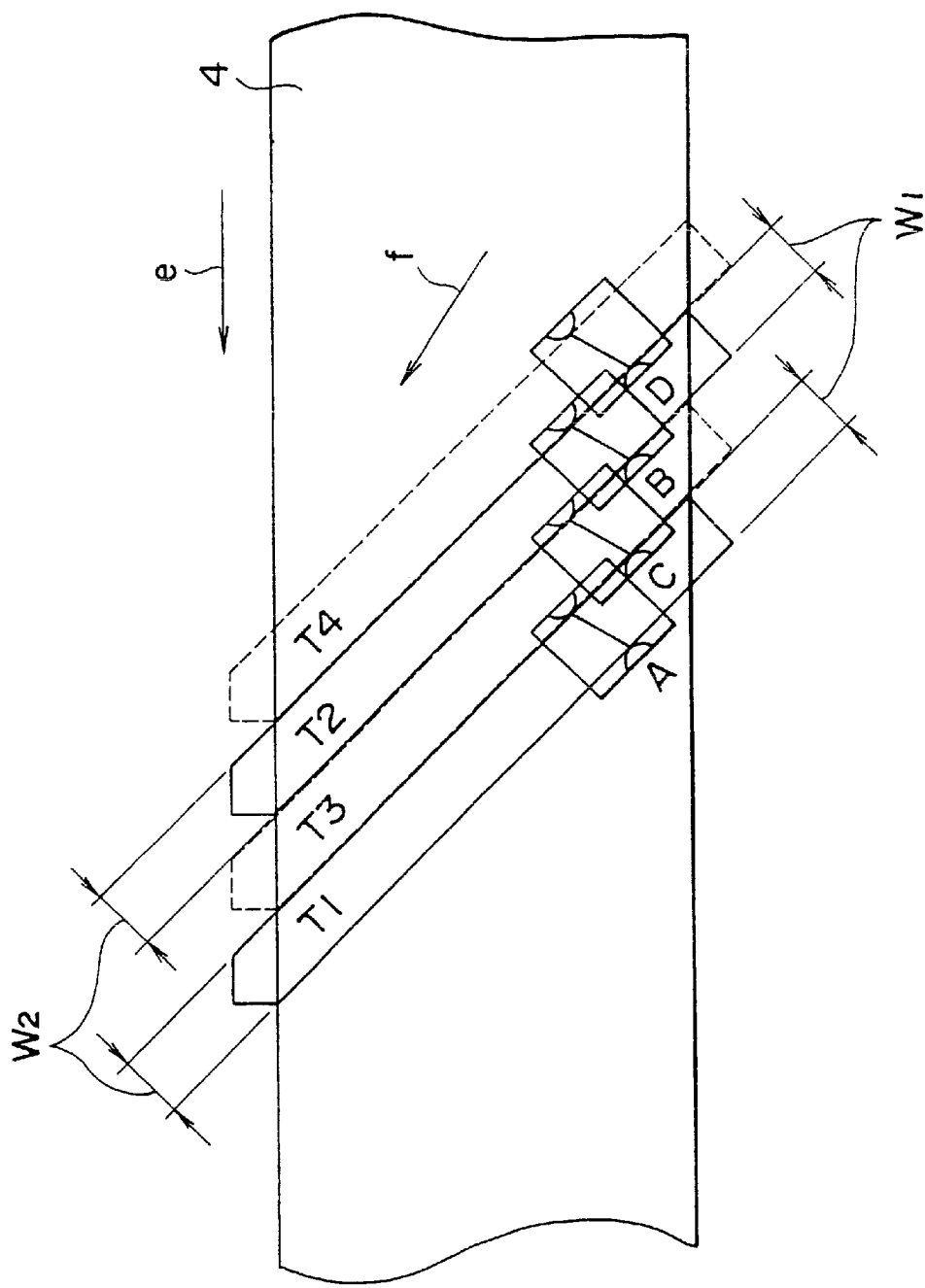
FIG. 15 is a diagram for illustrating the relationship between playback head and recording tracks of a magnetic tape in a conventional head arrangement.

Embodiments of helical scanning digital magnetic recording/playback device capable of variable speed playback in accordance with the present invention will be described in detail referring to FIG. 1 to FIG. 12. The same reference numerals are assigned to the same components in figures as shown in FIG. 13 to FIG. 15, and the redundant description is omitted. In FIG. 6 and FIG. 9, eight playback heads are represented by PB(A1), PB(A2), PB(A3), PB(A4), PB(A5), PB(A6), PB(A7), and PB(A8), but in FIG. 1 to FIG. 5, FIG. 7, FIG. 8, and FIG. 10 to FIG. 12, these eight playback heads are simply represented by A1, A2, A3, A4, A5, A6, A7, and A8.

Description of head mounted on a rotary head drum

First, as shown in FIG. 6 and FIG. 9, one erasing head ER(A/B) and two recording heads REC(A) and REC(B) different in azimuth are provided on the periphery of a rotary head drum 7 in the order of down flow of the rotation direction (arrow direction f) of the rotary head drum 7. In this arrangement, the erasing heads ER(A/B) serve both recording heads REC(A) and REC(B).

On the periphery of the rotary head drum 7, a total of four pairs of playback heads (for a total of eight playback heads) are mounted. Each playback pair head comprises two playback heads in the same azimuth, PB(A1) and PB(A2), PB(A3) and PB(A4), PB(A5) and PB(A6), and PB(A7) and PB(A8). The playback heads are mounted as one playback head series for reading one recording track T1 (refer to FIG. 1) recorded on a magnetic tape 4 by one recording head REC (A).

Also on the periphery of the rotary head drum 7, a total of four pairs of playback heads (for a total of eight playback heads)are mounted. Each playback pair head comprises two playback heads in the same azimuth (this azimuth is different from the azimuth of the one head series mentioned above), PB(B1) and PB(B2), PB(B3) and PB(B4), PB(B5) and PB(B6), and PB(B7) and PB(B8). The playback heads are mounted as the other playback head series for reading the other recording track T2 (refer to FIG. 1) recorded on a magnetic tape 4 by the other recording head REC (B).

The angular difference of a pair of heads of one playback head series between PB(A1) and PB(A2), PB(A3) and PB(A4), PB(A5) and PB(A6), or PB(A7) and PB(A8) is, for example, 12.8 degrees. Similarly, the angular difference of a pair of heads of the other playback head series between PB(B1) and PB(B2), PB(B3) and PB(B4), PB(B5) and PB(B6), or PB(B7) and PB(B8) is, for example, also 12.8 degrees.

On the rotary head drum 7 shown in FIG. 6, the angular interval between pairs of heads of one playback head series, namely the angular interval between playback head PB(A1) and PB(A3), and PB(A5) and PB(A7) is, for example, 90 degrees. Similarly, the angular interval between pairs of heads of the other playback head series, namely the angular interval between playback head PB(A1) and PB(A3), and PB(A5) and PB(A7) is, for example, also 90 degrees. Therefore, for one playback head positioned ahead of the other playback head of a pair of heads, namely PB(A1), PB(A3), PB(A5), and PB(A7), PB(A1) is positioned in central symmetry with PB(A5), and PB(A3) is positioned in central symmetry with PB(A7). For the playback head positioned behind the other playback head of a pair of heads, namely PB(A2), PB(A4), PB(A6), and PB(A8), PB(A2) is positioned in central symmetry with PB(A6) and PB(A4) is positioned in central symmetry with PB(A8). Similarly, the playback heads PB(B1), PB(B3), and PB(B2), PB(B4) are positioned in central symmetry with playback heads PB(B5), PB(B7), and PB(B6), PB(8) respectively.

Otherwise, in the case of a rotary head drum 7 shown in FIG. 9, the angular interval between pairs of heads of one playback head series, namely the angular interval between playback heads PB(A1) and PB(A3), and between PB(A5) and PB(A7) is, for example, 60 degrees, and the angular interval between the playback heads PB(A3) and PB(A5) is, for example, 12D degrees. Similarly, the angular interval between pairs of heads of the other playback head series, namely the angular interval between a playback head PB(B1) and PB(B3), and between PB(B5) and PB(B7) is, for example, 60 degrees, and the angular interval between the playback heads PB(B3) and PB(B5) is, for example, 120 degrees. Therefore, for the leading playback heads, the leading playback heads PB(A1) is positioned in central symmetry with the leading playback head PB(A5) and leading playback head PB(A3) is positioned in central symmetry with leading playback head PB(A7). For the trailing playback heads, the trailing playback heads PB(A2) is positioned in central symmetry with the trailing playback head PB(A6) and trailing playback head PB(A4) is positioned in central symmetry with trailing playback head PB(A8). Similarly, for the leading playback heads, the leading playback heads PB(B1) is positioned in central symmetry with leading playback head PB(B5) and leading playback head PB(B3) is positioned in central symmetry with leading playback head PB(B7). For the trailing playback heads, the trailing playback heads PB(B2) is positioned in central symmetry with the trailing playback head PB(B6) and trailing playback head PB(B4) is positioned in central symmetry with trailing playback head PB(B8).

In the case of the rotary head drum 7 shown in FIG. 6, leading playback heads of head pairs, PB(A1), PB(A3), PB(A5), PB(A7), and PB(B1), PB(B3), PB(B5) and PB(B7) are positioned at the same height level. However in the case of the rotary head drum 7 shown in FIG. 9, playback head PB(A3) and PB(B3) are positioned ⅔ track pitch higher than PB(A1) and PB(B1) respectively.

Description of pairs of heads

Next, the pairs of heads are described referring to FIG. 1 to FIG. 5. In the description the eight playback heads PB(A1), PB(A2), PB(A3), PB(A4), PB(A5), PB(A6), PB(A7), and PB(A8) are referred simply to as A1, A2, A3, A4, A5, A6, A7, and A8 respectively, and pairs of two playback heads A1 and A2, A3 and A4, A5 and A6, and A7 and A8 are referred simply to as head pairs.

Figure 1:
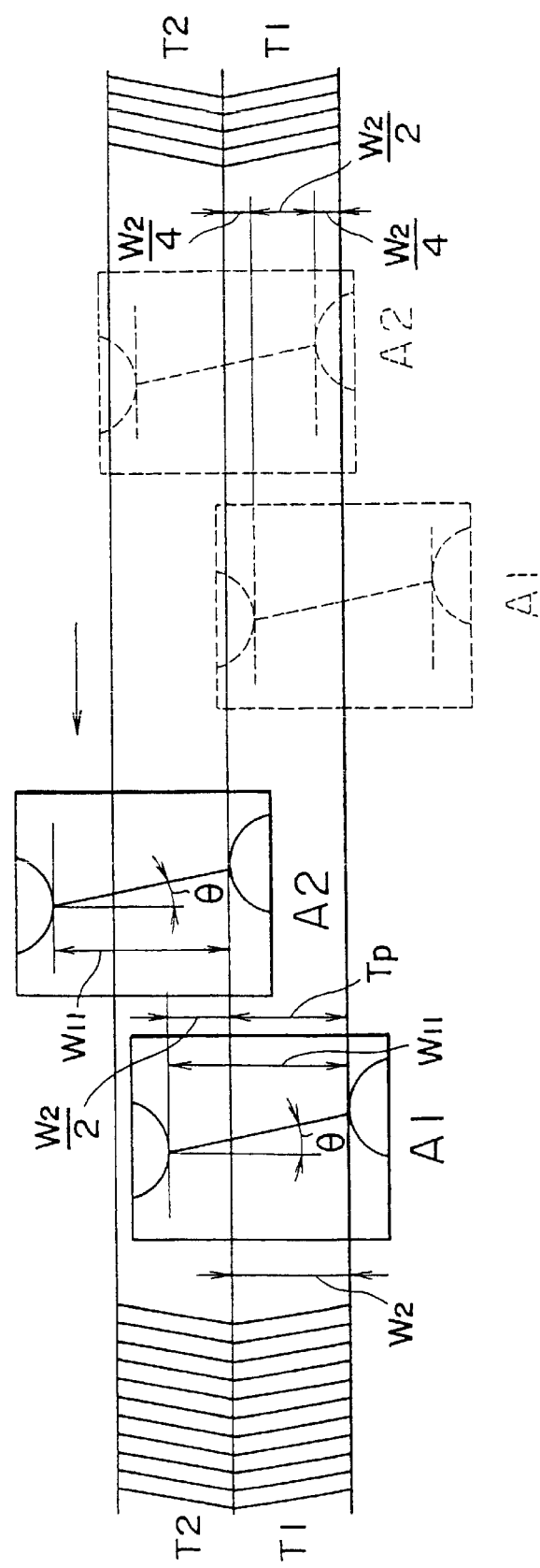
FIG. 1 is a diagram for illustrating the relationship of playback pair of heads in an embodiment of a helical scanning digital recording/playback device in accordance with the present invention.

In FIG. 1, T1 represents a recording track recorded on a magnetic tape 4 in helical scanning method by one recording head REC(A), and T2 represents a recording track recorded on a magnetic tape 4 in helical scanning method by the other recording head REC(B) different in azimuth from the recording head REC(A).

Figure 2:
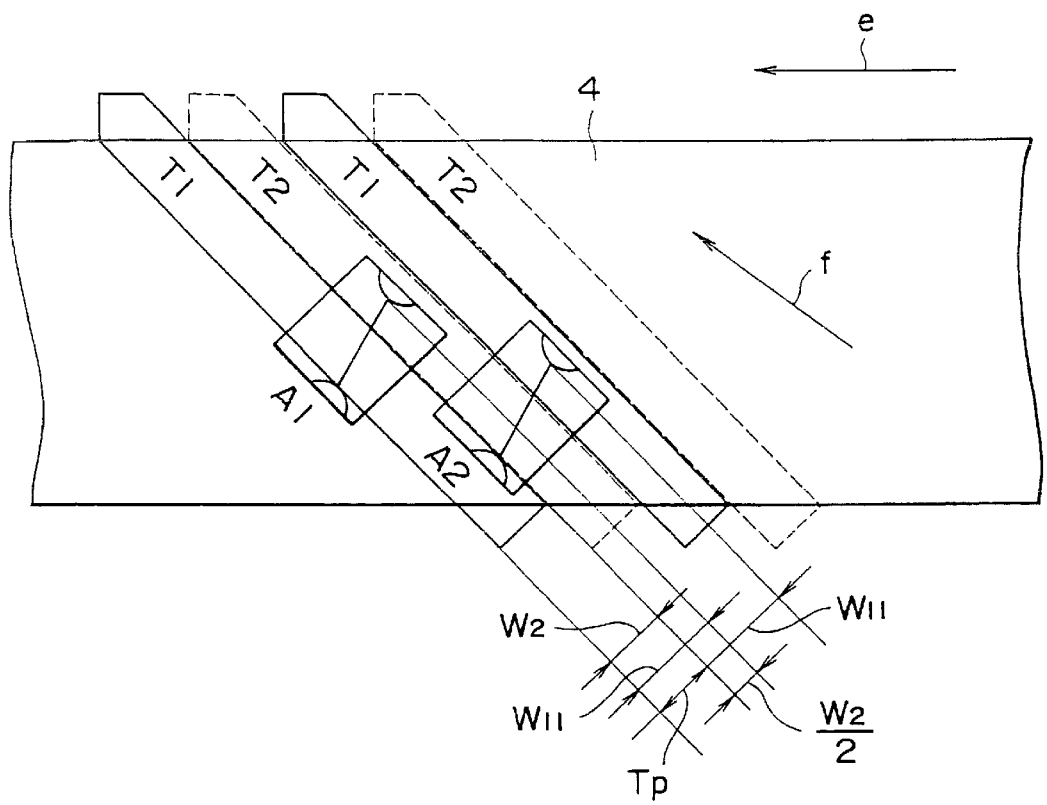
FIG. 2 is a diagram for illustrating the relationship between the pair of heads in FIG. 1 and recording heads of a magnetic tape.

As shown in FIG. 1 and FIG. 2, the head pair A1 and A2 for reading on recording track T1 simultaneously have the same azimuth θ, the angular difference on the drum between the positions of A1 and A2 is, for example, 12.8 degrees.

The track width $W_{11}$ of the pair of heads A1 and A2 has about 1.5 times the width of a recording head $W_2$ individually.

The head A2 has a gap of about one track pitch $T_p$ to A1 (A2 is positioned higher than A1), which is approximately the same as the track width $W_2$, in the width direction of a track (refer to the direction perpendicular to the longitudinal direction of the recording track T1).

Figure 3:
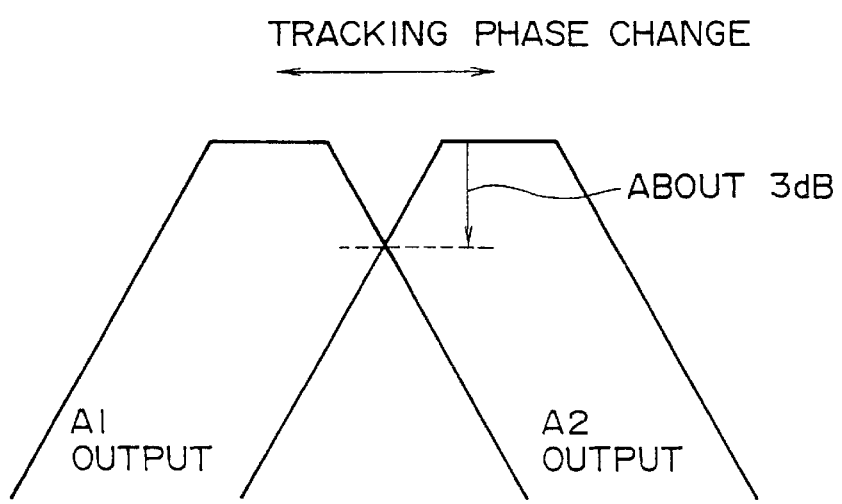
FIG. 3 is a diagram for illustrating the relationship between the tracking phase variation and playback output of the pair of heads shown in FIG. 1 and FIG. 2.

Therefore, the overlap of the head pair A1 and A2 during playback of a magnetic tape 4 is about $W_2/2$ which is equivalent to about 0.5 track pitch. As shown in FIG. 1 with a dotted line, if the tracking of the head pair A1 and A2 deviates, one of the heads A1 and A2 covers individually 75% or more of the track width $W_2$ that is $W_2+ (W_2/4)$ or more, and as shown in FIG. 3, the playback outputs of the pair head A1 and A2 intersects at about 3 dB attenuation level.

In this condition, if the tracking of the head pair A1 and A2 deviates during playback, one better error rate playback output of these two playback outputs of the head pair A1 and A2 is selected. If the playback outputs of A1 and A2 are the same, either output may be selected. Thus, all data of the recording track T1 are read correctly.

Figure 4:
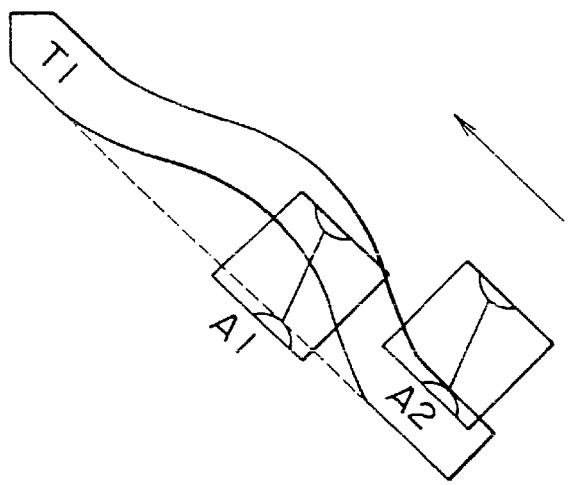
FIG. 4 is a diagram for illustrating the reading of a curved track of the pair of heads shown in FIG. 1.
Figure 5:
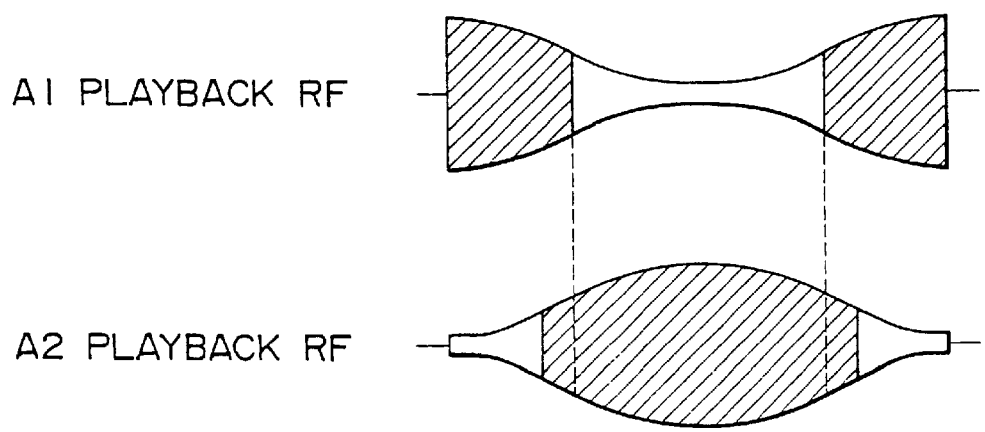
FIG. 5 is a diagram for illustrating the combination of playback outputs from a curved track of the pair of heads shown in FIG. 4.
Figure 6:
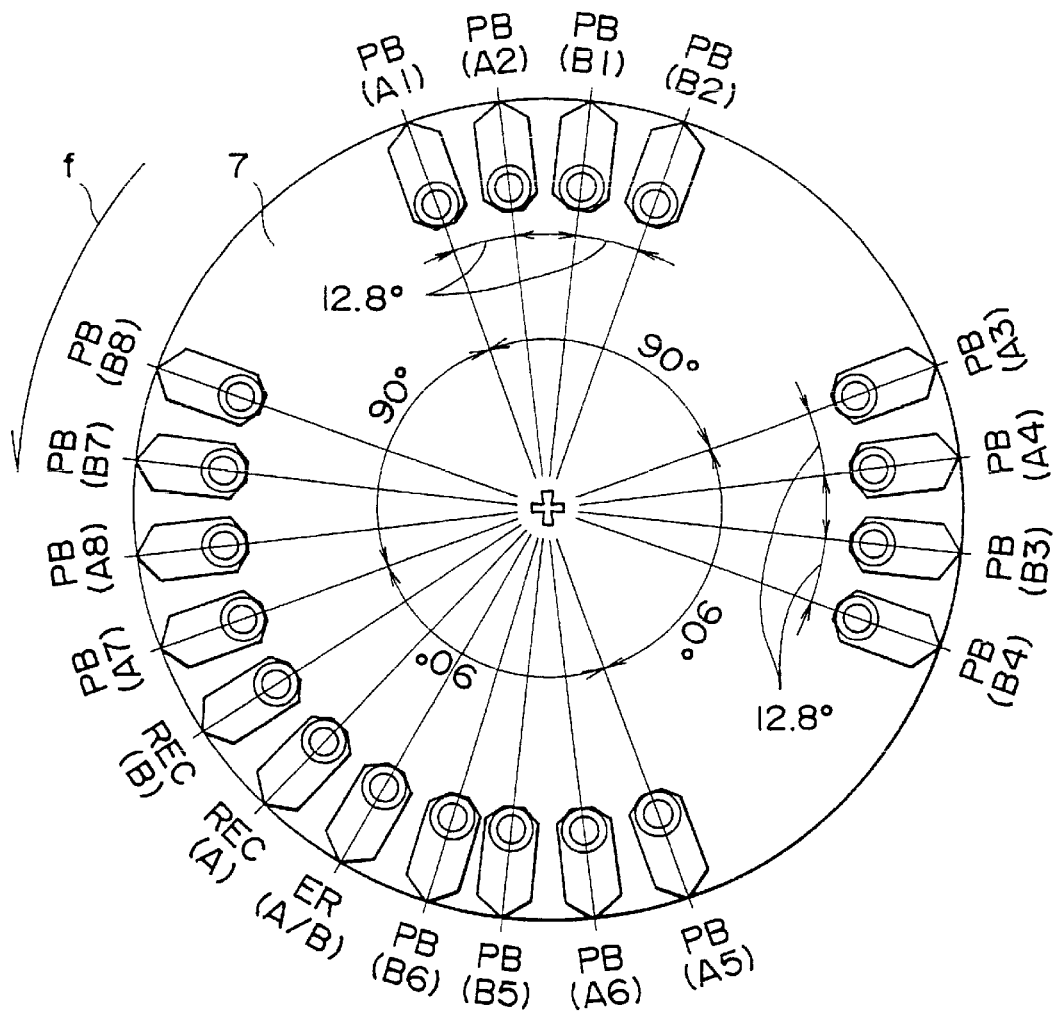
FIG. 6 is a bottom view of mounted heads provided with an angular interval between the pair of heads of 90 degrees, this arrangement is one of the examples of head arrangements on a rotary head drum capable of variable speed playback.

In the event of not only the deviation of the head pair A1 and A2 such as parallel deviation in the width direction of the track as shown in FIG. 1 with a dotted line but also severe track curving due to disturbance on tape path of a magnetic tape 4 as shown in FIG. 4, a playback signal with better error rate of the pair head A1 and A2 are selected and combined as shown in FIG. 5. Thus, all data blocks on the recording track T1 can be read correctly.

Therefore, in the trend of popularization of narrow track of helical scanning magnetic recording/playback devices, the present invention provides a helical scanning magnetic recording/playback device excellent in resistance to disturbance of the environment and stress and excellent in reliability, which does not require tracking while playback and brings cost saving.

Description of variable speed playback system capable of high speed data transfer.

Further in the present invention, N times pairs of heads are mounted on a single recording head. If a magnetic tape 4 is traveled at a speed of N times faster than that of usual playback while the rotation speed of the rotary head drum 7 is remained unchanged, in such a severe condition, all data on all tracks of the magnetic tape 4 are read correctly. Therefore, high speed data transfer is possible. Pairs of heads are preferably mounted as close as possible on the rotary head drum 7 and N pairs of heads are positioned with the same angular interval on the periphery of the rotary head drum 7.

Figure 7:
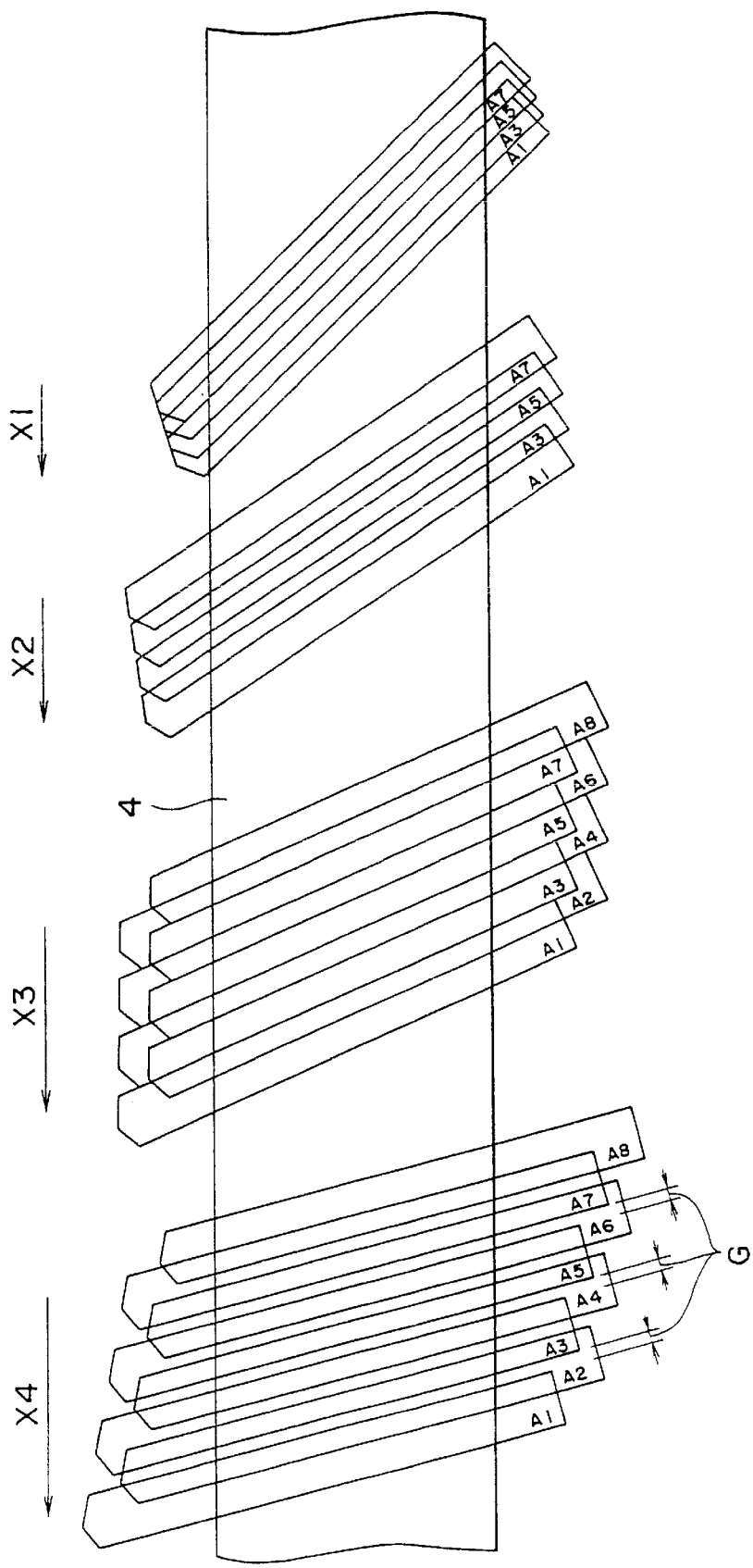
FIG. 7 is a diagram for illustrating a projected path of a pair of heads on a magnetic tape when variable speed playback from single speed to quadruple speed is operated in the forward direction of the magnetic tape using the head arrangement shown in FIG. 6.
Figure 8:
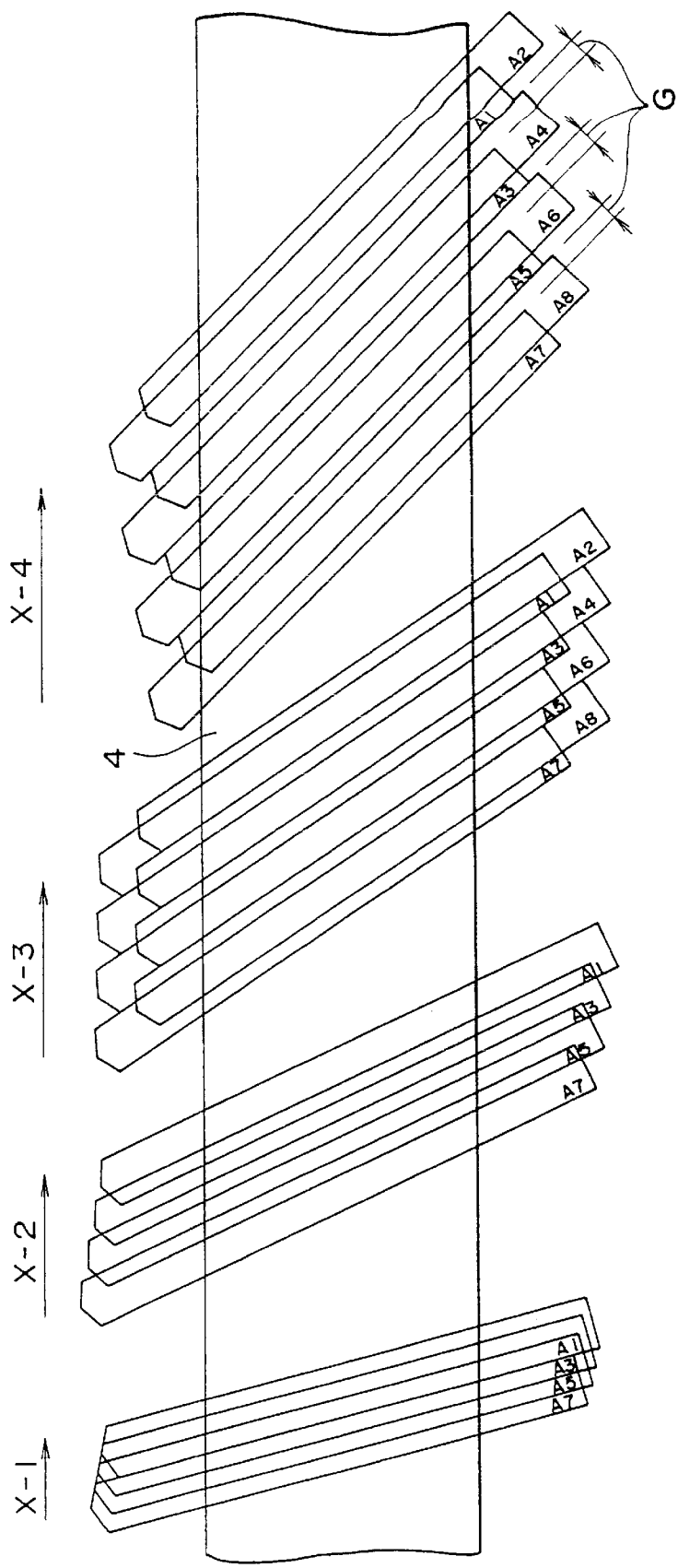
FIG. 8 is a diagram for illustrating a projected path of a pair of heads on a magnetic tape when variable speed playback from single speed to quadruple speed is operated in the reverse direction of the magnetic tape using the head arrangement shown in FIG. 6.
Figure 9:
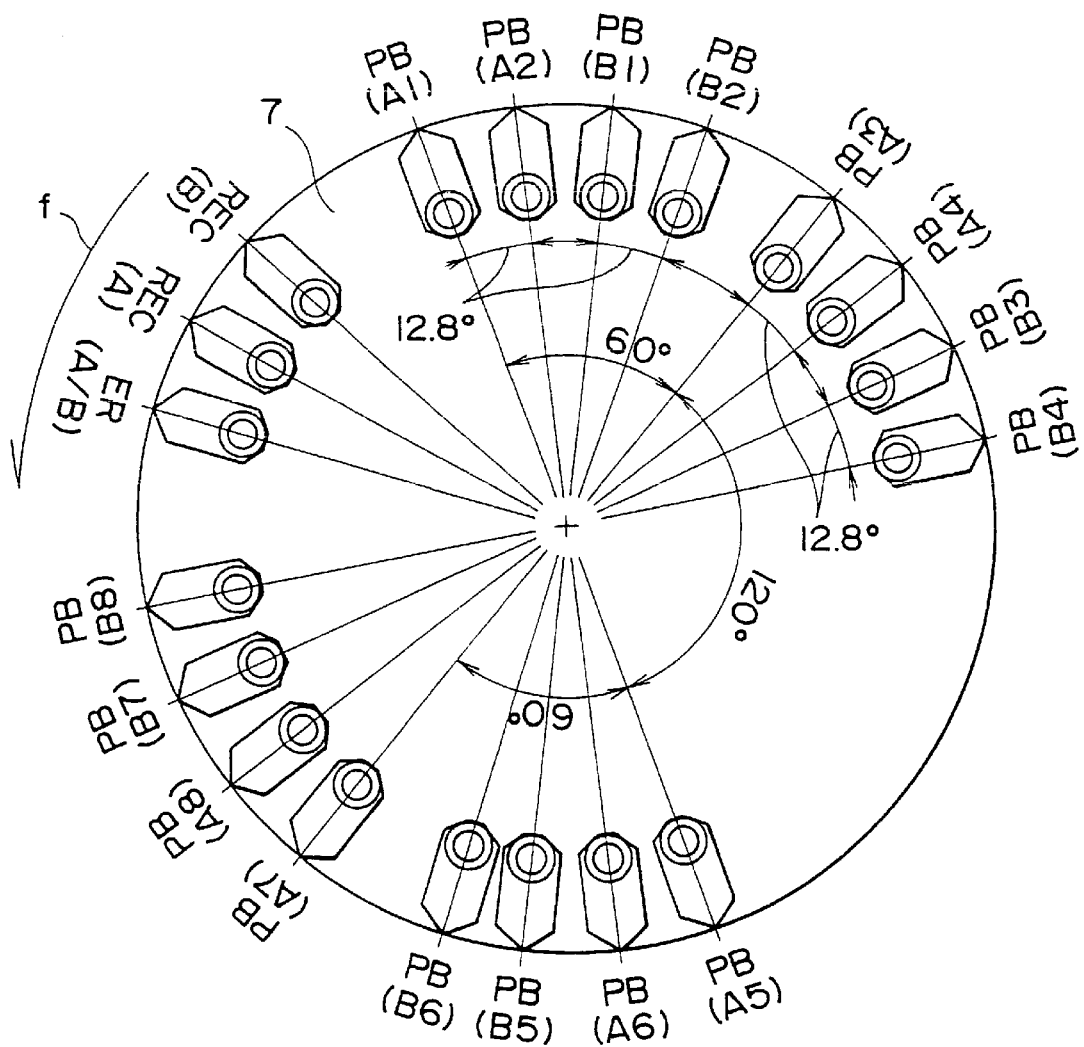
FIG. 9 is a bottom view of mounted head provided with an angular interval between a pair of heads of 60 degrees, this arrangement is one of the examples of a head arrangement on a rotary head drum capable of variable speed playback.

Herein an embodiment of such a variable speed playback system capable of quadruple high speed data transfer is described referring to FIG. 6 to FIG. 8. The head arrangement shown in FIG. 6 has been described above.

Four leading playback heads A1, A3, A5, and A7 of the pair heads are positioned with the same angular interval of 90 degrees and at the same height level as shown in FIG. 6.

When the traveling speed of a magnetic tape 4 in FWD direction, the forward direction, is varied from the usual speed of a single speed X1 to double speed X2, triple speed X3, and quadruple speed X4 as shown in FIG. 7, or as shown in FIG. 8 the traveling speed of a magnetic tape 4 in REV direction, the reverse direction, is varied from the single speed X-1, to double speed X-2, triple speed X-3, and quadruple speed X-4, while the rotation speed of the rotary head drum 7 is maintained unchanged, the paths of four playback heads A1, A3, A5, and A7 projected on the magnetic tape 4 have the same interval from each other for any traveling speed of the magnetic tape.

Therefore, regardless of the traveling speed of a magnetic tape 4 in FWD direction of single speed X1, double speed X2, triple speed X3, and quadruple speed X4, and in REV direction of single speed X-1, double speed X-2, triple speed X-3, and quadruple speed X-4, all data on the recording tack T1 of the magnetic tape 4 is read correctly without loss.

When the quadruple speed X4 in FWD direction and the quadruple speed X-4 in REV direction cause gaps G between projected paths of the playback heads A1, A3, A5, and A7, the gaps are covered by the playback heads A2, A4, A6, and A8 of the pair heads.

Figure 10:
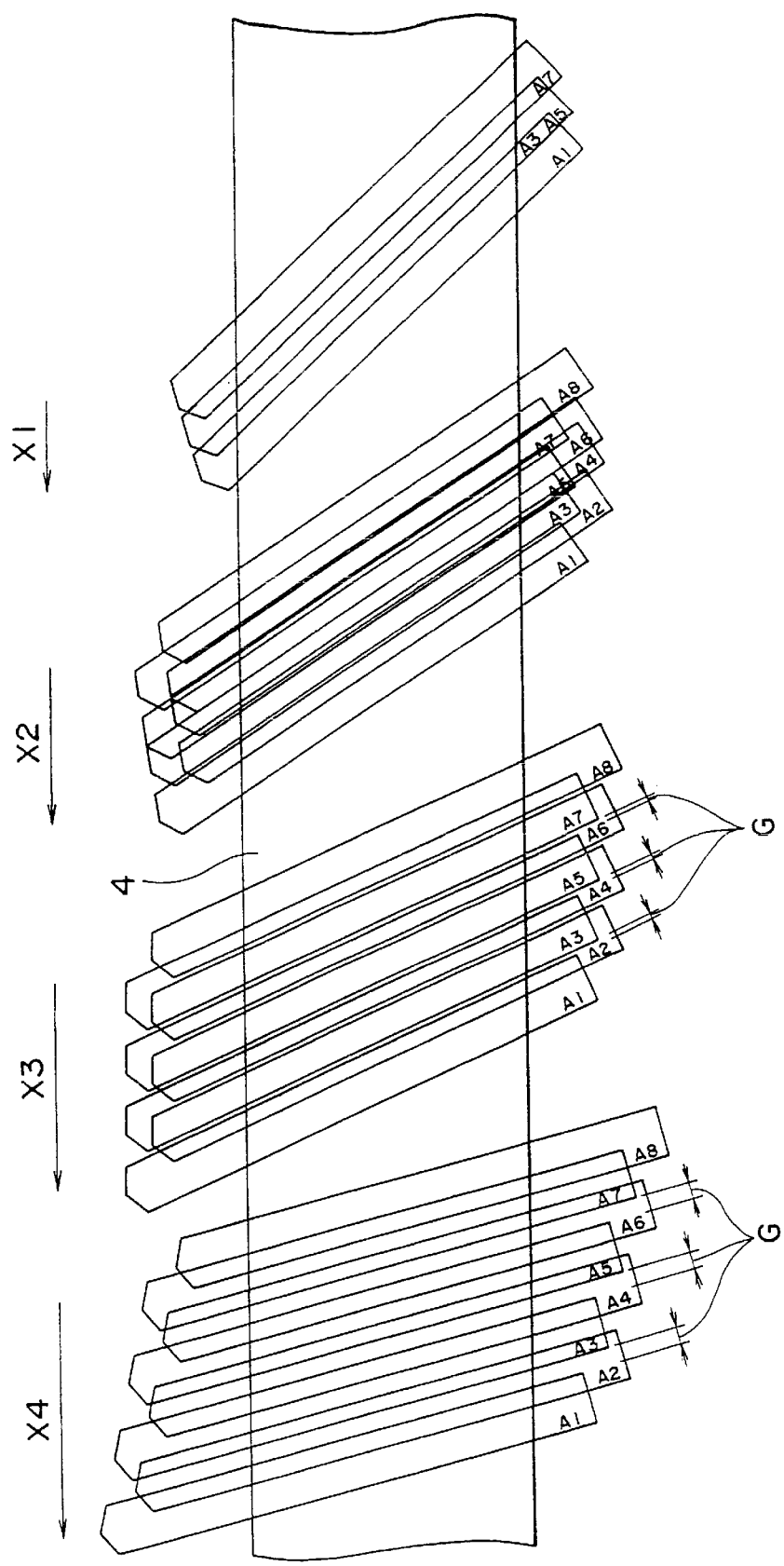
FIG. 10 is a diagram for illustrating a projected path of a pair of heads on a magnetic tape when variable speed playback from single speed to quadruple speed is operated in the forward direction of the magnetic tape using the head arrangement shown in FIG. 9.
Figure 11:
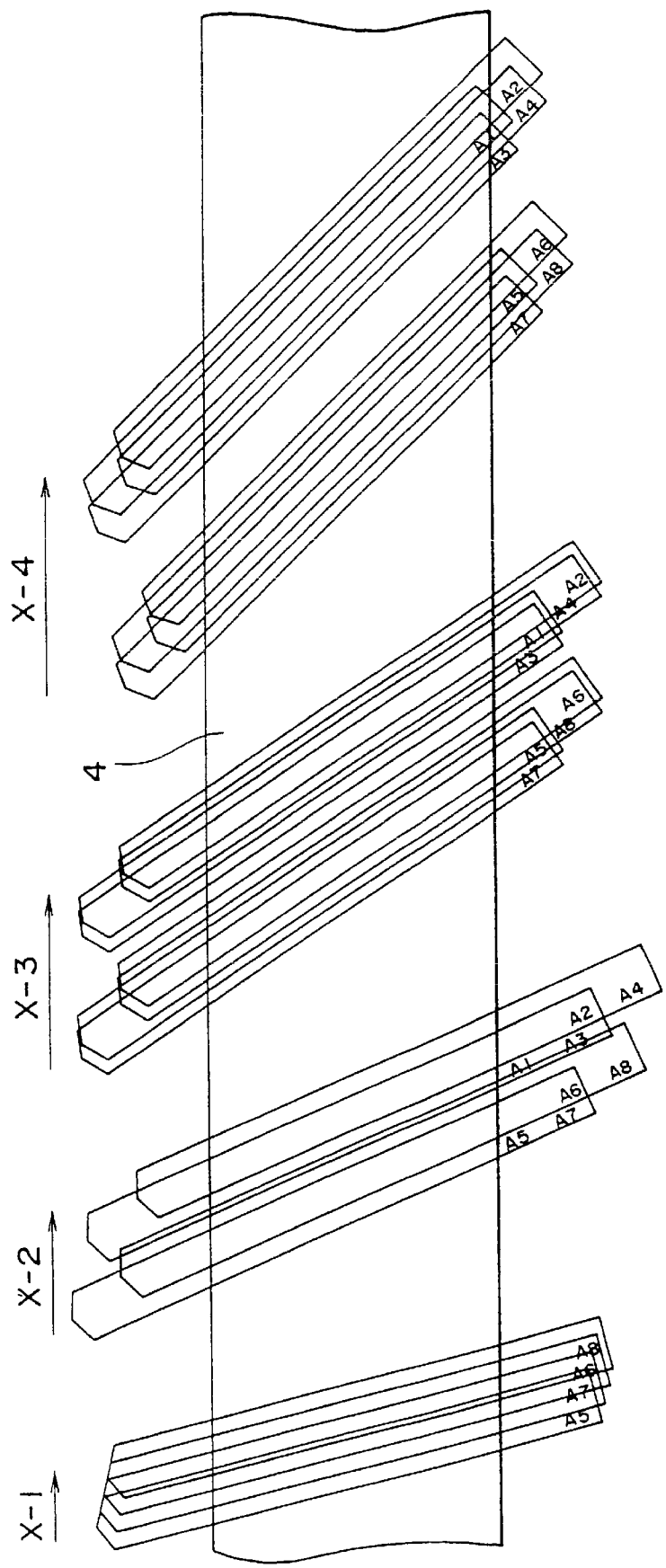
FIG. 11 is a diagram for illustrating a projected path of a pair of heads on a magnetic tape when variable speed playback from single speed to quadruple speed is operated in the reverse direction of the magnetic tape using the head arrangement shown in FIG. 9.

Next, another embodiment of the variable speed playback system capable of quadruple high speed data transfer is described referring to FIG. 9 to FIG. 11. The head arrangement shown in FIG. 9 has been described above.

For the four ahead playback heads of the pair heads A1, A3, A5, and A7, the angular intervals between A1 and A3, and between A5 and A7 are designed to be 60 degrees. A1 and A7 are positioned at the same height level, and on the other hand, A3 and A5 are positioned ⅔ track pitch higher than that of A1 and A7. Thereby, when the traveling speed of a magnetic tape 4 is varied from the single speed X1 to quadruple speed X4 in FWD direction and varied from the single speed X-1 to quadruple speed X-4 in REV direction while maintained the rotation speed of the rotary head drum 7 unchanged, the paths of four playback head A1, A3, A5, and A7 projected on the magnetic tape 4 have the same interval for the traveling speed of the magnetic tape 4 of triple speed X3 and quadruple speed X4 in FWD direction as shown in FIG. 10.

As shown in FIG. 10 for the traveling speed of single speed X1 and double speed X2 in FWD direction of the magnetic tape 4, the projected paths of the playback heads A3 and A5 overlap each other. As shown in FIG. 11 for the travelling speed of triple speed X-3 and quadruple speed X-4 in REV direction of the magnetic tape 4, the projected paths of the playback heads A1 to A3, and A5 to A7 overlap, and the projected paths of playback heads do not have the same interval.

Therefore, for the entire variable speed range from single speed X1 to quadruple speed X4 in FWD direction and single speed X-1 to quadruple speed X-4 in REV direction of the magnetic tape 4, it is preferable to structure the angular interval between the pair heads A1 and A2, A3 and A4, A5 and A6, and A7 and A8 individually to be the same angular interval of 90 degrees.

Description of switching circuit

A switching circuit 21 for selecting either one playback output from a pair of heads A1 or A2, A3 or A4, A5 or A6, and A7 or A8 will now be described. The other switching circuit for selecting either one playback output from a pair of heads B1 or B2, B3 or B4, B5 or B6, and B7 or B8 is structured in the same manner as that for the A-series pair of heads.

The output terminals of four pairs of two playback heads positioned in central symmetry, namely a pair of A1 and A5, a pair of A2 and A6, a pair of A3 and A7, and a pair of A4 and A8, are divided to four output systems, namely a-system, b-system, c-system, and d-system, which is selected (switched) by four switches of switch S1, S2, S3, and S4.

Consideration on the gap of pair heads

As described for FIG. 1 and FIG. 2, in the present invention, the paired heads A1 and A2 are positioned apart from each other with an angular difference of 12.8 degrees, and a gap of one track pitch Tp is provided between the leading playback head A1 and trailing playback head A2.

For the quadruple traveling speed of a magnetic tape 4 as mentioned herein above and for keeping the gap of one track pitch Tp between two playback heads A1 and A2, it is required to mount the playback head A1 at the position higher than that of the playback head A2 by a height difference, $T_p - 2T_p \times 4 \times 12.8$ degrees/360 degrees≈0.716 $T_p$.

However, for the single speed of a magnetic tape 4 described herein above, the traveling distance of the magnetic tape 4 while the rotary head drum 7 rotates 12.8 degrees is ¼ of the distance for the quadruple speed, therefore, the gap of one track pitch Tp is realized by mounting the playback head A2 at the position higher than that of the playback head A1 with a height difference, $T_p - 2T_p \times 1 \times 12.8$ degrees/360 degrees≈0.927 $T_p$.

As described herein above, the larger angular difference between two playback heads A1 and A2 requires the larger gap between the two playback heads A1 and A2, and theoretically, if the angular difference is zero, the gap can be zero.

Therefore, the gap between two playback heads A1 and A2 is once set for a certain traveling speed of a magnetic tape 4, the relationship of 3 dB between playback outputs described for FIG. 3 does not hold for other travelling speed, the playback head will miss data on some areas of a recording track.

However, in this embodiment, the quadruple speed gives the narrowest overlapped area of path projections on a magnetic tape 4 of two playback heads A1 and A2. Therefore, it is most preferable to set (select) the gap between two playback heads A1 and A2 to one track pitch Tp on the basis of quadruple speed.

Therefore, the variable speed playback system of the present invention is effectively functional for also the problem of the gap between a pair of heads. In detail, the two playback heads A1 and A2 satisfy the condition of pair of heads for quadruple speed, but does not satisfy the condition of the pair of heads for single speed.

However as shown in FIG. 7, two playback heads A1 and A5 satisfy the relationship of pair head for single speed X1.

The two playback heads A1 and A5 are positioned in central symmetry facing each other, and when a magnetic tape travels at a speed of single speed, only switching to a-system of the switching circuit 21 shown in FIG. 12 to operate amplifiers and IC of digital process of a-system allows the two playback heads A1 and A2 to function as a pair of heads.

When a magnetic tape travels at a speed of double speed as shown in FIG. 7, two playback heads A1 and A3, and A5 and A7 just satisfy the relationship of a pair of heads.

The two playback heads A1 and A3 are positioned in central symmetry with the two playback heads A5 and A7 respectively. Switching of two systems of a-system and b-system of the switching circuit shown in FIG. 12 to operate amplifiers and IC of digital process of these two a-system and b-system allows the two playback heads A1 and A3 and the two playback heads A5 and A7 to function as a pair of heads.

For the traveling speed of a magnetic tape in a range from double speed to quadruple speed, namely triple speed X3 and quadruple speed, all pairs of heads of A1 and A2, A3 and A4, A5 and A6, and A7 and A8 are functioned, and the functioning allows playback heads to read correctly all data on the recording track.

As described hereinbefore, to read data using all playback heads A1 to A8 for various traveling speeds of a magnetic tape 4 while the least relationship of a pair of heads is satisfied, it is effective to position the paired playback heads A1 and A2, A3 and A4, A5 and A6, and A7 and A8 with the same angular interval on the periphery of the rotary head drum 7.

The combination of a pair of heads is selected simply for matching to the traveling speed of a magnetic tape 4 using the switching circuit shown in FIG. 12. Therefore, useless processing system of playback head is saved and the use of the digital magnetic recording/playback device realizes overall energy saving and low cost.

The embodiments in accordance with the present invention are described hereinbefore, however, the scope of the present invention is by no means limited to the embodiments, various modifications are applied within the technical scope of the invention.

For example, in the above-mentioned embodiments the angular interval of pair heads of 90 degrees and 60 degrees are described, however, the structure of a pair of heads may have various angular intervals of pair heads such as 45 degrees, 120 degrees, and other various equi-angular intervals (360 degrees/N, wherein N represents the number of pair heads) to achieve the object that data on the recording track of a magnetic tape are read without missing within a wide speed mode range of traveling speed of the magnetic tape. The number of playback head pairs is by no means limited to four pairs described in the embodiments, and may be more than four pairs and may be less than four pairs.

The helical scanning magnetic recording/playback system in accordance with the present invention structured as described hereinbefore exerts the following effects.

A helical scanning magnetic recording/playback device is excellent in resistance to external disturbance from environment and stress, excellent in reliability, and with saved cost due to no tracking mechanism. A helical scanning magnetic recording/playback system provided with pairs of playback heads, each pair of heads comprises two playback heads, positioned in the same azimuth and having a track width wider than the track width of the recording head. These playback heads in the form of paired heads read simultaneously one recording track in the condition with a gap of the area of partially overlapped in the width direction of the track so that all data of the recording track are read without tracking during playback.

A helical magnetic recording/playback device is provided with a pair of playback heads, each pair head comprises two playback heads, positioned in the same azimuth and having a track width wider than the track width of the recording head. These playback heads in the form of paired heads read simultaneously one recording track in the condition with a gap of the area of partially overlapped in the width direction of the track so that all data on the recording track are read without tracking during playback. A plurality of playback head pairs, each playback head pair comprises two playback heads, is mounted with equiangular interval on the periphery of a rotary head drum so that all data on the recording track are read correctly without variation of the rotation speed of the rotary head drum and without tracking while playback. Thereby, a problem of response sensibility of a servo system associated with matching of the rotation speed of the rotary head drum to the traveling speed of a magnetic tape, and a problem of fluctuating contact of a playback head to the magnetic tape due to change in the rotation speed of the rotary head drum are both solved and consistently stable playback performance is obtained. Expensive dynamic tracking heads are not required for variable speed playback, the device of the present invention costs very low and, in addition, the optimization of the angular interval for a pair of heads results in the usability of the device-in the wide range of traveling speed of a magnetic tape not only in FWD direction but also in REV direction.

Each track width of playback heads, in which the playback heads are grouped into pairs and each pair comprises two playback heads, is prescribed to 1.5 times the track width of the abovementioned recording head individually. The gap of these playback heads in the width direction is prescribed to about one track pitch which is nearly equal to the track width of the above-mentioned recording track. Thus, all data on the recording track of a magnetic tape are read stably and correctly, and the helical scanning magnetic recording/playback device of the invention can accept a narrow track.

A switching circuit is provided for selecting a playback output from a pair of playback heads which are positioned in central symmetry. Thereby, the combination of a pair of heads is selected simply for matching to the traveling speed of a magnetic tape while variable speed playback, useless processing system of playback head is eliminated, and overall energy saving and cost saving are realized.

What is claimed is:

1. A helical scanning magnetic recording/playback device comprising:
    a plurality of recording heads for writing a plurality of recording tracks on a helically scanned magnetic tape mounted on a periphery of a rotary head drum, and
    a plurality of playback head pairs, each playback head pair comprising two playback heads for reading the recording tracks on the helically scanned magnetic tape mounted on the periphery of said rotary head drum,
    wherein playback heads in said plurality of playback head pairs have a track width wider than the track width of the recording heads, each playback head in a pair of heads being mounted at the same azimuth as the other playback head in each pair of heads and each pair of heads reads one recording track simultaneously with the track widths of each pair of heads partially overlapping each other in the track width direction to produce a gap between the track widths of the playback heads in each head pair.

2. The helical scanning magnetic recording/playback device as claimed in claim 1, further comprising a switching circuit for selecting an output from a playback head in each pair of playback heads based on error rates of the playback heads in each pair of playback heads.

3. The helical scanning magnetic recording/playback device as claimed in claim 2, wherein the switching circuit alternates between outputs of playback heads in each pair of playback heads during playback of the one recording track.

4. The helical scanning magnetic recording/playback device as claimed in claim 1, wherein the plurality of playback head pairs comprise four playback head pairs.

5. The helical scanning magnetic recording/playback device as claimed in claim 4, wherein each of the four pairs of playback head pairs is separated by an adjacent pair of playback heads by 90 degrees.

6. The helical scanning magnetic recording/playback device as claimed in claim 4, wherein each of the four pairs of playback head pairs is separated by an adjacent pair of playback heads by 60 degrees.

7. The helical scanning magnetic recording/playback device as claimed in claim 1, wherein playback heads in each pair are positioned 180 degrees from each other.

8. The helical scanning magnetic recording/playback device as claimed in claim 1, wherein playback heads in each pair are positioned 90 degrees from each other.

9. The helical scanning magnetic recording/playback device as claimed in claim 1, wherein pairs of playback heads selected for their outputs vary with a tape speed.

10. The helical scanning magnetic recording/playback device as claimed in claim 9, wherein playback heads in each pair are positioned 180 degrees from each other at a single tape speed.

11. The helical scanning magnetic recording/playback device as claimed in claim 9, wherein playback heads in each pair are positioned 90 degrees from each other at a double tape speed.

12. The helical scanning magnetic recording/playback device as claimed in claim 9, wherein playback heads in each pair are positioned 12.8 degrees from each other at a triple or higher tape speed.

13. A helical scanning magnetic recording/playback device comprising:

a plurality of recording heads for writing a plurality of recording tracks on a helically scanned magnetic tape mounted on a periphery of a rotary head drum, and a plurality of playback head pairs, each playback head pair comprising two playback heads for reading in the recording tracks on the helically scanned magnetic tape mounted on the periphery of said rotary head drum, wherein playback heads in said plurality of playback head pairs have a track width wider than the track width of the recording heads, each playback head in a pair of heads being mounted at the same azimuth as the other playback head in each pair of heads and each pair of heads reads one recording track simultaneously with the track widths of each pair of heads partially overlapping each other in the track width direction to produce a gap between the track widths of the playback heads in each head pair, and wherein said plurality of playback head pairs being mounted at equi-angular intervals on the periphery of said rotary head drum.

14. The helical scanning magnetic recording/playback device as claimed in claim 1 or claim 13, wherein the track width of each playback head is 1.5 times the track width of said recording tracks, and the gap of these playback heads in the track width direction is about one track pitch which is approximately equal to the track width of said recording tracks.

15. The helical scanning magnetic recording/playback device as claimed in claim 14, further comprising a switching circuit for selecting a playback output from a single playback head from each pair of playback heads.

16. The helical canning magnetic recording/playback device as claimed in claim 1 or claim 13, further comprising a switching circuit for selecting a playback output from a single playback head from each pair of playback heads.

17. The helical scanning magnetic recording/playback device as claimed in claim 13, further comprising a switching circuit for selecting an output from a playback head in each pair of playback heads based on error rates of the playback heads in each pair of playback heads.

18. The helical scanning magnetic recording/playback device as claimed in claim 17, wherein the switching circuit alternates between outputs of playback heads in each pair of playback heads during playback of the one recording track.

19. The helical scanning magnetic recording/playback device as claimed in claim 13, wherein the plurality of playback head pairs comprise four playback head pairs.

20. The helical scanning magnetic recording/playback device as claimed in claim 19, wherein each of the four pairs of playback head pairs is separated by an adjacent pair of playback heads by 90 degrees.

21. The helical scanning magnetic recording/playback device as claimed in claim 19, wherein each of the four pairs of playback head pairs is separated by an adjacent pair of playback heads by 60 degrees.

* * * * *

UNITED STATES PATENT AND TRADEMARK OFFICE
CERTIFICATE OF CORRECTION

Page 1 of 1

PATENT NO. : 6,304,410 B1
DATED : October 16, 2001
INVENTOR(S) : Mikio Kita; Kaoru Urata It is certified that error appears in the above-identified patent and that said Letters Patent is hereby corrected as shown below:

Column 12, claim 16,
Line 19, replace "canning" with -- scanning --.

Signed and Sealed this

Nineteenth Day of March, 2002

Attest:

JAMES E. ROGAN
Attesting Officer    Director of the United States Patent and Trademark Office